US011066615B2

(12) United States Patent
Thomaides et al.

(10) Patent No.: US 11,066,615 B2
(45) Date of Patent: Jul. 20, 2021

(54) COPOLYMERS OF BICYCLIC (METH)ACRYLATE AND ALKYL (METH)ACRYLATE AND THEIR USE AS RHEOLOGY MODIFIERS IN FUELS

(71) Applicant: Akzo Nobel Chemicals International B.V., Arnhem (NL)

(72) Inventors: John Socrates Thomaides, Berkeley Heights, NJ (US); John M. Morales, Warren, NJ (US); Qiwei He, Belle Mead, NJ (US); Philip Nigel Threlfall-Holmes, Durham (GB); Damien Christian Vadillo, Franklin, NJ (US); Michael Timothy Philbin, Hopewell, NJ (US)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 15/572,310

(22) PCT Filed: May 19, 2016

(86) PCT No.: PCT/EP2016/061215
§ 371 (c)(1),
(2) Date: Nov. 7, 2017

(87) PCT Pub. No.: WO2016/188837
PCT Pub. Date: Dec. 1, 2016

(65) Prior Publication Data
US 2018/0127669 A1    May 10, 2018

Related U.S. Application Data

(60) Provisional application No. 62/165,254, filed on May 22, 2015.

(30) Foreign Application Priority Data

Jul. 29, 2015 (EP) .................................... 15178876

(51) Int. Cl.
| | | |
|---|---|---|
| *C08F 220/00* | (2006.01) | |
| *C08F 220/18* | (2006.01) | |
| *C10L 1/196* | (2006.01) | |
| *C10L 10/14* | (2006.01) | |
| *C10L 1/195* | (2006.01) | |

(52) U.S. Cl.
CPC .......... *C10L 1/1963* (2013.01); *C08F 220/18* (2013.01); *C10L 10/14* (2013.01); *C08F 220/1804* (2020.02); *C08F 220/1811* (2020.02); *C10L 1/195* (2013.01); *C10L 2200/0407* (2013.01); *C10L 2200/0446* (2013.01); *C10L 2230/22* (2013.01); *C10L 2270/02* (2013.01); *C10L 2270/026* (2013.01)

(58) Field of Classification Search
CPC .... C08F 220/00; C08F 220/18; C08F 212/08; C10L 1/195
See application file for complete search history.

(56) References Cited

U.S. PATENT DOCUMENTS

| | | |
|---|---|---|
| 3,485,775 A | 12/1969 | Cenci et al. |
| 3,553,294 A | 1/1971 | McGary, Jr. et al. |
| 4,131,572 A | 12/1978 | Brendley, Jr. |
| 4,188,219 A | 2/1980 | Cawley |
| 4,388,434 A | 6/1983 | Swift et al. |
| 4,983,186 A | 1/1991 | Naiman et al. |
| 5,906,665 A | 5/1999 | Trippe et al. |
| 6,586,097 B1 | 7/2003 | Pascault et al. |
| 6,624,273 B1* | 9/2003 | Everaerts ............... C09J 135/06 526/317.1 |
| 8,043,388 B2 | 10/2011 | Waters et al. |
| 2006/0142168 A1* | 6/2006 | Kinker .................. C10M 161/00 508/466 |
| 2009/0064568 A1* | 3/2009 | Stohr ...................... C10L 1/196 44/308 |
| 2011/0192076 A1* | 8/2011 | Hess ..................... C10L 1/1963 44/388 |

(Continued)

FOREIGN PATENT DOCUMENTS

| | | |
|---|---|---|
| CA | 2 889 070 C | 11/2017 |
| CN | 101410497 A | 4/2009 |

(Continued)

OTHER PUBLICATIONS

Huaxue Yu Nianhe (2006), 28(3), 194-197, Coden: Hyzhen; ISSN: 1001-0017, Abstract.
Burgt et al. "The Shell Middle Distillate Synthesis Process," 5th Synfuels Worldwide Symposium, Washington DC, (1985).
European Search Report issued in the counterpart European Application No. 15178876.7 dated Dec. 7, 2015.
Notification of Transmittal of the International Search Report and the Written Opinion of the International Searching Authority, or the Declaration from the International Bureau of WIPO for International Application No. PCT/EP2016/061215 dated Jun. 22, 2016.

(Continued)

Primary Examiner — Ellen M McAvoy
Assistant Examiner — Ming Cheung Po
(74) Attorney, Agent, or Firm — Lorenz & Kopf, LLP

(57) ABSTRACT

The invention relates to specific copolymers obtainable by co-polymerizing at least the following monomers: at least one bicyclic (meth)acrylate ester at least one lower-alkyl (meth)acrylate optionally, and preferably, at least one aromatic vinyl monomer; and optionally other ethylenically unsaturated monomers, whereby the copolymer has a weight averaged molecular weight of from 100,000 to 10,000,000 D, determined using GPC-MALS techniques for a solution in THF at 40° C., as well as to the way to synthesize such copolymers and the use of such polymers to modify the rheology of a liquid in which they are soluble.

20 Claims, No Drawings

(56) References Cited

U.S. PATENT DOCUMENTS

| | | | |
|---|---|---|---|
| 2012/0276380 A1* | 11/2012 | Traser | C09J 133/08 428/355 EN |
| 2015/0197591 A1 | 7/2015 | Pierre et al. | |
| 2016/0272746 A1 | 9/2016 | Utsunomiya | |
| 2016/0280814 A1 | 9/2016 | Nakao | |

FOREIGN PATENT DOCUMENTS

| | | |
|---|---|---|
| CN | 103992428 A | 8/2014 |
| DE | 1122197 B | 1/1962 |
| EP | 0 626 442 A1 | 11/1994 |
| EP | 1 260 278 A2 | 11/2002 |
| GB | 573364 A | 11/1945 |
| GB | 1 259 113 A | 1/1972 |
| GB | 1 332 593 A | 10/1973 |
| GB | 1 569 344 A | 6/1980 |
| JP | 2015/110768 A | 6/2015 |
| WO | 2006/116692 A1 | 11/2006 |
| WO | 2014/110203 A1 | 7/2014 |
| WO | 2014/148148 A1 | 9/2014 |
| WO | 2015/071600 A1 | 5/2015 |
| WO | 2015/091513 A1 | 6/2015 |
| WO | 2016/188839 A1 | 12/2016 |
| WO | 2016188850 A1 | 12/2016 |
| WO | 2017/134189 A1 | 8/2017 |

OTHER PUBLICATIONS

Koike et al., Polym. Int. 2015, 64, 188-195.
Zhang et al., Journal of Applied Polymer Science, 2013, 113-120.
Imoto, S. et al. "The Synthesis of Bornylmethacrylate and Isobornylmethacrylate along with the Radical Copolymerization of Stryene, and Vinyl Chloriride", The Journal of Industrial Chemicals, 1963, pp. 988-991, vol. 66, No. 7.
Imoto, M. et al. "Vinyl Polymerization LXXIII. Polymerization and Copolymerization of Bornyl or Isobornyl Methacrylate," Journal of Polymer Science: Part A, 1964, pp. 1407-1419, vol. 2.
Koike, K., et al. "A highly transparent and thermally stable copolymer of 1-adamantyl methacrylate and styrene", Polymer Int., 2015, pp. 188-195, vol. 64.
Zhang, B. et al., "Preparation of Poly(styrene-co-isobornyl methacrylate) Beads Having Controlled Glass Transition Temperature by Suspension Polymerization", Journal of Applied Polymer Science, 2013, pp. 113-120, vol. 129, No. 1.

* cited by examiner

COPOLYMERS OF BICYCLIC (METH)ACRYLATE AND ALKYL (METH)ACRYLATE AND THEIR USE AS RHEOLOGY MODIFIERS IN FUELS

This application is a national stage filing under 35 U.S.C. § 371 of PCT/EP2016/061215, filed May 19, 2016, which claims priority to U.S. Provisional Patent Application No. 62/165,254 filed May 22, 2015, and European Patent Application No. 15178876.7, filed Jul. 29, 2015, the contents of which are each incorporated herein by reference in their entireties.

FIELD OF INVENTION

The present invention relates to a copolymer, its synthesis and uses of the copolymer.

BACKGROUND

Polymers have previously been used for modifying the rheology of a fluid containing the polymer. There is a need for polymers that can be used to adjust the flow and spray characteristics of a petroleum based fuel, such as gasoline and diesel fuel.

Liquid hydrocarbon fuels as such are typically not combustible. They must first be vaporized and mixed with air, or oxygen, to burn. As middle distillate or heavier petroleum fuel fractions have low vapor pressures, efficient atomization is a critical aspect of spray combustion of such fuels.

Atomization produces fine liquid fuel particles, whose large surface area leads to fast evaporation and thus rapid and efficient combustion. Even with efficient atomization stoichiometric combustion cannot be achieved. Limitation is imposed in this respect by the inability to reach a condition of perfect mixing in the time and size scale of the combustion process and equipment. In order to get complete combustion, therefore, it is necessary to supply excess air to the system.

Excess air, to the extent it provides complete combustion, serves to increase combustion efficiency. However, too much air can lead to a decrease in heat recovery. All of the oxygen not involved in the combustion process as well as all of the nitrogen in the air is heated and thus carries heat out of the stack. Further, the greater the excess air the greater the mass flow through the system and the shorter the time scale for heat transfer. Hence, achieving efficient combustion and heat recovery requires a delicate balance of atomization and excess air coupled with optimized combustion chamber and heat recovery system designs.

GB 1 569 344 relates to the use of polymers, especially poly-isobutylene, to modify the fuel properties in an attempt to improve the combustion efficiency. A problem with poly-isobutylene was found that it is very difficult to handle, which is exemplified by its Tg of −75° C. Other known polymers like poly-lauryl methacrylate also suffer from such a low Tg. Other polymers, such as poly isobornyl (meth)acrylates, were found to not give the desired rheological properties and to be prohibitively expensive. Also most polymers with higher Tg were found to suffer from insufficient solubility of the polymer, making them unsuitable for changing the rheology of the liquid. Therefore, there still exists a need for alternative polymers with the ability of modifying the rheology of liquids, such as petroleum based fuel, at a reasonable cost.

SUMMARY OF INVENTION

One object of the invention is to provide a polymer with the ability to modify the rheology of petroleum based fuel, in a manner that can positively influence the combustion efficiency in an internal combustion engine run using such fuel.

The present inventors have found that this object can at least partly be met by a polymer according to the present invention, which will now be more described in detail.

The present invention relates to a copolymer obtainable by copolymerizing the following monomers:
one or more bicyclic (meth)acrylate esters,
one or more lower-alkyl (meth)acrylates,
optionally, and preferably, one or more aromatic vinyl monomers,
optionally further ethylenically unsaturated monomers,
whereby the copolymer has a weight averaged molecular weight from 100,000 to 10,000,000 Dalton.

In the context of this invention, the term "(meth)acrylate" refers to acrylate and methacrylate.

It is noted that in prior art such as WO 2015/091513 and EP-A-0626442 polymers with a similar composition have been proposed. However the polymers produced therein have a molecular weight that is too low to allow for an efficient ability of modifying the rheology of liquids, such as petroleum based fuels. Other prior art, presenting higher molecular weight polymers, were found to suffer from solubility problems in most solvents, largely due to their composition being without bicyclic (meth)acrylate ester, resulting in unfavorable cloud points in many solvents, particularly diesel fuels.

DETAILED DESCRIPTION OF THE INVENTION

The bicyclic (meth)acrylate ester contains a (meth)acryloyl radical bonded to a six-membered carbon atom bridged ring and said group of monomers include products like decahydronaphthyl (meth)acrylates, and adamantyl (meth)acrylates, but preferred are products according to formula (I)

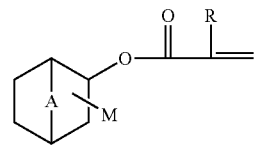

wherein
R is H or —CH$_3$,
A is —CH$_2$—, —CH(CH$_3$)— or —C(CH$_3$)$_2$—, and
one or more M is covalently bonded to any carbon of the bicyclic rings, preferably to a carbon atom of the six-membered ring, and each M is independently selected from the group consisting of hydrogen, halogen, methyl and methylamino group or a plurality thereof. Non-limiting examples of the bicyclic (meth)acrylate esters include isobornyl (meth)acrylate, bornyl (meth)acrylate, fenchyl (meth)acrylate, isofenchyl (meth)acrylate, norbornyl methacrylate, cis, (endo) 3-methylamino-2-bornyl (meth)acrylate, 1,4,5,6,7,7-hexachlorobicyclo [2.2.1]-hept-5-ene-2-ol methacrylate (HCBOMA) and 1,4,5,6,7,7-hexachlorobicyclo [2.2.1]-hept-5-ene-2 methanol methacrylate (HCBMA), and mixtures of such bicyclic methacrylates. The chlorinated compounds are less preferred since they can liberate corrosive HCl when burned. A preferred bicyclic methacrylate ester is isobornyl methacrylate. The bicyclic (meth)acrylate esters are known per se and may be prepared in known fashion or may be obtained from commercial sources. The bicyclic (meth)acrylate is preferably chosen from monomers which, when polymerized, form a homopolymer that is soluble in the liquid, preferably in fuel, more preferably in the diesel fuel.

The lower-alkyl (meth)acrylate of the invention are compounds wherein a (meth)acryloyl radical is bonded to a lower alkyl group, herein defined as a C1-C7, preferably C1-4, alkyl group, which can be linear or branched, substituted or unsubstituted, saturated or unsaturated. Examples of the alkyl (meth)acrylate, include methyl methacrylate, ethyl (meth)acrylate, propyl (meth)acrylate, butyl (meth)acrylate, pentyl (meth)(acrylate) and hexyl (meth) acrylate. The currently preferred alkyl (meth)acrylate is iso-butyl methacrylate. The lower-alkyl (meth)acrylate is preferably chosen from monomers which, when polymerized, form a homopolymer that is not soluble in the liquid, preferably in fuel, more preferably in the diesel fuel.

The aromatic vinyl monomer contains a vinyl group bonded to an aromatic group. In an embodiment it is styrene, substituted styrene, vinyl naphthalene, divinylbenzene, and mixtures thereof. Preferred substituted styrenes include ortho-, meta- and/or para-alkyl, alkyloxy or halogen substituted styrenes, such as methyl styrene, tert-butyloxy styrene, 2-chlorostyrene and 4-chlorostyrene. The preferred aromatic vinyl monomer is styrene. The aromatic vinyl monomer is preferably chosen from monomers which, when polymerized, form a homopolymer that is not soluble in the liquid, preferably in fuel, more preferably in the diesel fuel.

Further monomers that may participate in the copolymerization process are ethylenically unsaturated monomers different from the monomers (a), (b) and (c) defined above. Examples of such other monomers include 4-tert-butyl styrene, cationic, nonionic and anionic ethylenically unsaturated monomers known to those skilled in the art, and include, but are not limited to ethylenically unsaturated acids, such as (meth)acrylic acid, maleic acid, 2-acrylamido-2-methylpropane sulfonic acid, dimethylaminoethyl methacrylate, dimethylaminoethyl acrylate, N-[3-(dimethylamino) propyl] methacrylamide, N-[3-(dimethylamino) propyl] acrylamide, (3-acrylamidopropyl)-trimethyl-ammonium chloride, methacrylamido propyl trimethyl ammonium chloride, methacrylamide, N-alkyl (meth)acrylamides, N-vinyl pyrrolidone, N-vinyl caprolactams, vinyl formamide, vinyl acetamide, higher-alkyl(meth)acrylates, where higher-alkyl is herein defined as straight or branched, saturated or unsaturated, substituted or unsubstituted hydrocarbyl chain containing 8 or more, such as 8 to 24, carbon atoms.

The copolymer may be synthesized by conventional methods for vinyl addition polymerization known to those skilled in the art, such as, but not limited to, solution polymerization, precipitation polymerization, and dispersion polymerizations, including suspension polymerization and emulsion polymerization.

In an embodiment the polymer is formed by suspension polymerization, wherein monomers that are insoluble in water or poorly soluble in water are suspended as droplets in water. The monomer droplet suspension is maintained by mechanical agitation and the addition of stabilizers. Surface active polymers such as cellulose ethers, poly(vinyl alcohol-co-vinyl acetate), poly(vinyl pyrrolidone) and alkali metal salts of (meth)acrylic acid containing polymers and colloidal (water insoluble) inorganic powders such as tricalcium phosphate, hydroxyapatite, barium sulfate, kaolin, and magnesium silicates can be used as stabilizers. In addition, small amounts of surfactants such as sodium dodecylbenzene sulfonate can be used together with the stabilizer(s). Polymerization is initiated using an oil soluble initiator. Suitable initiators include peroxides such as benzoyl peroxide, peroxy esters such as tert-butylperoxy-2-ethylhexanoate, and azo compounds such as 2,2'-azobis(2-methylbutyronitrile). At the completion of the polymerization, solid polymer product can be separated from the reaction medium by filtration and washed with water, acid, base, or solvent to remove unreacted monomer or free stabilizer.

In another embodiment the polymer is formed by emulsion polymerization, one or more monomers are dispersed in an aqueous phase and polymerization is initiated using a water soluble initiator. The monomers are typically water insoluble or very poorly soluble in water, and a surfactant or soap is used to stabilize the monomer droplets in the aqueous phase. Polymerization occurs in the swollen micelles and latex particles. Other ingredients that might be present in an emulsion polymerization include chain transfer agents such as mercaptans (e.g. dodecyl mercaptan) to control molecular weight and electrolytes to control pH. Suitable initiators include alkali metal or ammonium salts of persulfate such as ammonium persulfate, water-soluble azo compounds such as 2,2'-azobis(2-aminopropane)dihydrochloride, and redox systems such as Fe(II) and cumene hydroperoxide, and tert-butyl hydroperoxide-Fe(II)-sodium ascorbate. Suitable surfactants include anionic surfactants such as fatty acid soaps (e.g. sodium or potassium stearate), sulfates and sulfonates (e.g. sodium dodecyl benzene sulfonate), sulfosuccinates (e.g. dioctyl sodium sulfosuccinate); non-ionic surfactants such as octylphenol ethoxylates and linear and branched alcohol ethoxylates; cationic surfactants such as cetyl trimethyl ammonium chloride; and amphoteric surfactants. Anionic surfactants and combinations of anionic surfactants and non-ionic surfactants are most commonly used. Polymeric stabilizers such as poly(vinyl alcohol-co-vinyl acetate) can also be used as surfactants. The solid polymer product free of the aqueous medium can be obtained by a number of processes including destabilization/coagulation of the final emulsion followed by filtration, solvent precipitation of the polymer from latex, or spray drying of the latex.

One skilled in the art will recognize that certain surfactants and initiator systems could leave residues in the polymer that will be undesirable in the fuel. These might include sulfur containing species, mono- and multivalent metal ions, and halide ions. One can either select alternative surfactants and initiators that will not leave such residues, or choose an isolation/purification process that will remove or minimize any unwanted residues.

For the copolymers of the invention the amount of bicyclic (meth)acrylate ester (a) that is used in the monomer composition is 20 wt % or more, suitably 21, 23, 25, or 30 wt % or more, based on the weight of all monomer, because such copolymers were found to have the desired solubility, as determined by the cloud point, in fuels.

Preferably, the copolymer is polymerized from:
22 to 95 wt % of the bicyclic (meth)acrylate ester (a);
5 to 78 wt % of the lower-alkyl (meth)acrylate (b);
0 to 45 wt % of the aromatic vinyl monomer (c);
And up to 50 wt % of further ethylenically unsaturated monomers (d).

Throughout this document, the weight percentages of the monomer that constitute the copolymer, are based on the total weight of the monomers used, whereby the total weight of the monomers adds up to 100 wt %.

More preferably, the copolymer of the invention is polymerized from
40 to 90 wt % of the bicyclic (meth)acrylate ester (a);
10 to 60 wt % of the lower-alkyl (meth)acrylate (b);
5 to 40 wt % of the aromatic vinyl monomer (c); and up to 40 wt % of the further ethylenically unsaturated monomers (d).

In another embodiment the copolymer of the invention is polymerized from 50 to 80 wt % of the bicyclic (meth)acrylate ester (a);
15 to 45 wt % of the lower-alkyl (meth)acrylate (b);
10 to 30 wt % of the aromatic vinyl monomer (c); and
up to 30 wt % of the further ethylenically unsaturated monomers (d).

For each of the embodiments it is preferred that the amount of monomer (a) is more than 15, preferably more than 20 wt % more than the amount of monomer (c), since that was found to positively influence the solubility of the copolymer.

Preferably, in each embodiment, the amount of the other ethylenically unsaturated monomers (d) does not exceed 20 wt %, 15 wt %, 9 wt %, or 5 wt %, and in certain embodiments, monomers a), b) and c) together constitute 100 wt % of the monomers used to form the copolymer.

In a proviso, the copolymers may not be composed of at least one bicyclic (meth)acrylate ester, at least one fatty-alkyl (meth)acrylate, and at least one lower-alkyl (meth) acrylate. Also they may not be copolymers of at least one bicyclic (meth)acrylate ester, at least one fatty-alkyl (meth) acrylate, at least one lower-alkyl (meth)acrylate, and at least one aromatic vinyl monomer. In another proviso, they are not copolymers wherein the weight percentage of fatty-alkyl (meth)acrylate is 5-80, or 5-40 weight percent of the monomers polymerized. In another proviso, they are not copolymers wherein the sum of bicyclic (meth)acrylate ester and fatty-alkyl (meth)acrylate is greater than or equal to 35 wt. % more preferably, greater than or equal to 50%; and most preferably, greater than or equal to 55 wt. % of the total monomer composition that is polymerized.

In another proviso, the copolymers of the invention may not be copolymers of lauryl methacrylate, isobornyl methacrylate, 2-phenoxy ethylacrylate, 2-ethylhexyl acrylate, and isodecyl methacrylate, particularly not copolymers wherein the monomers are polymerized in the same molar amount, more particularly not such copolymers obtained by solution polymerization at 100° C. using 1 part of Vazo® 67, per 216.4 parts of monomers, as the initiator, since such polymers were found not to have the desired properties.

It was noted that although the homopolymers of styrene and isobutyl methacrylate are not soluble in B7 diesel fuel, a surprisingly large amounts of these monomers can be copolymerized with isobornyl methacrylate to give highly soluble copolymers. For example, based on weight fraction of each comonomer in the examples and using a linear mixing model, one would expect the cloud points which are significantly higher than the ones actually found and reported herein. In a preferred embodiment the copolymer has a cloud point which is at least 5, more preferably at least 10° C. below the value calculated using the linear mixing model.

If so desired, particularly to control the molecular weight and the molecular weight distribution of the polymer and/or to control rheological behavior of solutions of the polymer, small amounts of divinylbenzene can be used in the mix of monomers. Typically divinylbenzene levels are below 5%, preferably below 2%, more preferably below 1%.

In the copolymer of the invention, the monomers may be arranged in any fashion, such as in blocks or randomly. Preferably, the copolymer is a randomly arranged copolymer.

The weight averaged molecular weight (Mw) of the copolymer of the invention, when measured in accordance with GPC-MALS method d) of the experimental section, is preferably at least 100,000 Dalton (D), suitably at least 200,000, 300,000, 400,000, 500,000, 600,000, 700,000, 800,000, 900,000, and/or at least 1,000,000 D. In another embodiment the molecular weight (Mw) of the invention is at least 1,500,000, suitably 2,000,000 or more. The upper molecular weight is determined by the solubility in the fluid in which it is intended to be used. A suitable Mw is 10,000,000 or less, suitably less than 9,000,000, 8,000,000, 7,000,000, 6,000,000, and/or 5,000,000 D. Polymers with a composition of the invention and a weight averaged molecular weight of from 1,000,000 to 5,000,000, suitably from 2,000,000 to 5,000,000 D were found to be useful at low concentrations, which made them particularly suitable for the application in fuel, particularly for use in additive packages for fuel.

Polymers with a Mw of 400 kD or more showed the desired effective control of rheology when dissolved in fluids. Particularly for copolymers of just isobornyl (meth) acrylate and C1-C4 alkyl (meth)acrylate the number-average molecular weight is suitably chosen to be greater than 400 kD, since only then are the desired properties obtained for controlling the rheology of a fluid in which they are dissolved. The polydispersity index (PDI), i.e. Mw/Mn, of the copolymer of the invention was found not to be critical and is suitably from 1, or 2, or 3, up to 10, or 8, or 6. In an embodiment the PDI is from 1 to 5 or from 1.5 to 4.

The glass transition temperature of the copolymer of the invention is preferably from 50 to 190° C., more preferably from 65 to 150° C., even more preferably from 95 to 140° C., as determined by Differential Scanning calorimetry (DSC). In this document the glass transition temperatures (Tg) were measured using a DSC Q200 (TA Instruments, New Castle, Del.) with the following program:

1) Start DSC run with isothermal of 15 min at 20 degree C.;
2) Ramp the temperature at 10 degree C./min to roughly 20 degree C. above the Tg of the material;
3) Run isothermal at that temperature for 5 min;
4) Ramp temperature down from 20 degree C. above Tg at 20 degree C./min to 20 degree C.;
5) Run isothermal at 20 degree C. for 5 min;
6) Start the Modulate mode with the process condition of +/−1.280 degree C. for every 60 second;
7) Ramp the temperature at 2 degree C./min to 180 degree C.;

The composition of the polymer can be reliably estimated from the relative amounts of the monomers fed into the polymerization. Alternatively, the composition of the copolymer is suitably determined from carbon-13 NMR spectra using a Varian MR-400 MHz and/or an Agilent DD2 MR 500 MHz NMR spectrometer.

The polymer of the invention is advantageously added to a petroleum based fuel suitable for running combustion engines, such as fuels conventionally known as gasoline and diesel fuels. The polymer is preferably added to the fuel in an amount effective to obtain a combustion efficiency improving effect. Typically, the polymer of the invention is added to the fuel to concentrations below 1 wt %, or 5000 ppm (parts per million), such as from 5, from 10, from 50, from 100 or from 500 ppm, preferably up to 3000 or 1000 ppm. The term "ppm" equates to one mg per kg. In an embodiment, the copolymer is preferably present in a fuel composition in amount in the range of from 10 ppm to 300 ppm, more preferably in the range of from 10 to 100, for example 25 ppm to 80 ppm, based on the total weight of the fuel composition.

The advantages of the copolymers of this invention are that (1) they are better suited to adjust the flow and spray characteristics of a petroleum based fuel than conventional polymers; (2) the Tg of the copolymers is high enough to allow handling of the polymer as solids, (3) the cost of these copolymers will be lower than that of poly(isobornyl methacrylate) and other conventional polymers, and (4) they can be used in additive packages for use in fuel.

It is noted that the copolymers of the invention may also be added to fluids in general, non-polar fluids or compositions comprising non-polar fluids in particular, to modify the rheology of such fluids. Suitably the viscosity of the fluids is increased by dissolution of less than 1% w/w, preferably less than 0.5% w/w, of the copolymer, based on the weight of the total composition.

As used herein, "gasoline" refers to a liquid hydrocarbon based fuel suitable for running a spark ignition engine, as is commonly known in the art, and includes such fuels from petroleum raw material, renewable raw material, and mixtures thereof.

As used herein "diesel" refers to a liquid hydrocarbon based fuel suitable for running a compression ignition engine, as is commonly known in the art, and includes such fuels from petroleum raw material, renewable raw material, and mixtures thereof.

The term "consisting" wherever used herein also embraces "consisting substantially", but may optionally be limited to its strict meaning of "consisting entirely".

In the context of the invention the term '(meth)acrylate' indicates acrylate or methacrylate, and '(co)polymer' indicates polymer or copolymer. The term 'polymer' and the term 'copolymer' are used herein interchangeably.

In additions to the hydrocarbons and the polymer, gasoline and diesel fuels may contain other additives as commonly used in the art. For determining solubility in diesel, a diesel fuel B7 in accordance with the EN 590 diesel fuel specification is used. An additive package is a combination of two or more components which can be added to a fuel. Because the amount of additive for each component is below 100%, the accuracy of dosing is improved. The use of the combination also facilitates the handling since one composition is to be handled rather than the individual components. The additive package is suitably a dissolution of the components in a solvent, because the controlled pre-dissolution of the polymer allows easier mixing with/dissolution in a fuel.

A polymer is considered to be soluble in accordance with the invention when at least a 2.0 wt % solution of the polymer in the diesel at 25° C. can be made, if necessary after heating. Preferably a 2.0 wt % solution of the polymer in the diesel at 8° C. can be made. Preferably the copolymer of any embodiment of the invention, when analysed as described below in the experimental section, shows a cloud point below 25° C., more preferably a cloud point below 15° C., and even more preferably a cloud point below 5° C.

EXAMPLES

A series of exemplary inventive copolymers and comparative polymers were made using different combinations of isobornyl methacrylate, styrene, and isobutyl methacrylate. Isobornyl methacrylate was obtained from Sigma-Aldrich or Evonik (VISIOMER® terra IBOMA). Styrene and isobutyl methacrylate were obtained from Sigma-Aldrich.

Molecular Weight:
Four different methods were used to determine polymer molecular weight.

Method A:
Molecular weight was determined by Gel Permeation Chromatography (GPC) using narrow range polystyrene calibration standards. Samples and narrow range polystyrene calibration standards were prepared by dissolving 14-17 mg in 5 mL of tetrahydrofuran (mobile phase).
Column: (300 mm×7.5 mm ID), Polymer Labs PL Gel Mixed C
Mobile phase (Mp); Tetrahydrofuran
Flow: 0.8 mL/min
Injection: 50 µL
RI Detector and column temperature: 40° C.

Method B:
Molecular weight was determined by Gel Permeation Chromatography (GPC) using narrow range polystyrene calibration standards. Samples and narrow range polystyrene calibration standards were prepared by dissolving 12-15 mg in 10 mL of tetrahydrofuran (mobile phase).
Column: (300 mm×7.5 mm ID), Phenomenex® Phenogel, 5 µm Linear (2) mixed;
Mobile phase (Mp): Tetrahydrofuran;
Flow: 0.6 mL/min;
Injection: 50 µL;
RI Detector and column temperature: 40° C.

Method C:
Molecular weight was determined by GPC-MALS, 40° C. Quantitation was a semi-batch mode by analysis using a guard column only. Samples were prepared by dissolving about 10 mg in 10 mL of tetrahydrofuran (mobile phase). Samples were further diluted with tetrahydrofuran as needed.
Column: Phenogel Guard 10^6 A (50 mm×7.8 mm)
Flow Rate: 0.5 ml/min THF
Injection: 50 µl
Detection: Wyatt® Dawn Heleos 18 angle MALS 633 nm and
Wyatt Optilab T-REX Refractive Index Detector
Quantitation Zimm or Debye $1^{st}$ order of $2^{nd}$ order, with 5 to 18 angles Method D:
Molecular weight was determined by GPC-MALS. Samples were prepared by dissolving about 8 mg in 8 mL of tetrahydrofuran (mobile phase).
Column: 30 cm×4 mm 5 µm Phenogel Linear 2—nominal 10M exclusion
Column Oven: 40 C
Solvent: Stabilized THF at 0.30 ml/min
Injection: 50 µl
Detection: Wyatt Dawn Heleos 18 angle MALS 633 nm and
Wyatt Optilab T-REX Refractive Index Detector.

Synthesis Example S1

Preparation of Copolymer by Suspension Polymerization Process.
Materials:

| | |
|---|---|
| Hydroxyapatite | 1.2060 g |
| Sodium dodecyl benzene sulfonate [1% solution in deionized water; made by dissolution of WITCONATE 90-Flake (ex AkzoNobel) in deionized water] | 0.4883 g |
| Water | 165.06 g |
| Isobornyl methacrylate (IBOMA) | 33.0210 g |

-continued

| | |
|---|---|
| Isobutyl methacrylate (IBMA) | 6.0023 g |
| Styrene | 21.0154 g |
| Vazo ® 67 [2,2'-Azobis(2-methylbutyronitrile); ex DuPont ™] | 0.2738 g |

A 4-neck 500 mL round bottom flask was equipped with a mechanical stirring paddle; a Y-tube equipped with an $N_2$-inlet topped reflux condenser and thermometer; and two stoppers. To the flask was charged HAP. To 165.06 g deionized water was charged 0.4883 g 1% sodium dodecyl benzene sulfonate. The resulting solution was charged to the reaction vessel, and the resulting suspension was heated to 80° C. under a positive pressure of nitrogen using a thermostat-controlled heating mantle. In a 125 mL Erlenmeyer flask, a solution of Vazo® 67 in isobornyl methacrylate, styrene, and isobutyl methacrylate was prepared. The solution was added in one portion to the reaction vessel, and the stirring rate was set to 690 rpm for 3 minutes and then lowered 375 rpm. The polymerization was held at 80° C. for a total of 6 h. During the course of the polymerization very little build-up of solids was noted on the flask wall or the thermometer. After 6 h at 80° C., the reaction was cooled in an ice water bath with stirring and then allowed to stand overnight. A large amount of polymer beads were seen to fall from suspension, and the supernatant was essentially clear.

The pH of the polymer suspension was measured and found to be 6.91 at ~21° C. The pH was lowered to 1.51 by the addition of dilute nitric acid with vigorous stirring and held at this pH for 1 h. At the end of the hold, the pH had drifted down to 1.48. The reaction mixture was transferred to a blender where it was homogenized for about 60 s. The solids were isolated by vacuum filtration (paper filter). The product was washed with many 200 mL portions of tap water on the filter until the pH of the filtrate was 6.5 to 7. The product was then washed with 200 mL deionized water; 200 mL 1:1 (v:v) methanol/water; 200 mL methanol; and 2×200 mL deionized water. The solid product was dried to a constant weight in a vacuum oven (~40° C.). The yield of solid product was 58.14 g. The non-volatile content of the product was 98.6.

The MW was measured by GPC method A; results: Mn: 94,677; Mw: 351,230; PDI: 3.71

Carbon-13 NMR measured in $CDCl_3$. By NMR, the copolymer is composed of 55.6 wt. % isobornyl methacrylate, 34.1 wt. % styrene, and 10.3 wt. % isobutyl methacrylate. This is nearly identical to the monomer feed by weight, which was 55% isobornyl methacrylate, 35% styrene, and 10% isobutyl methacrylate.

Synthesis Example S2

Preparation of Copolymer by Emulsion Polymerization Process
Materials:

| Initial Charge: | |
|---|---|
| Deionized water | 632.6 g |
| Aerosol ® OT-75 PG (sodium dioctyl sulfosuccinate, 75% in propylene glycol and water; available from Cytec) | 10.91 g |
| 1% NaOH | As needed |
| Co-solvent: | |
| Acetone | 139.6 g |
| Monomer mix: | |
| Isobornyl methacrylate | 165 g |
| Styrene | 105.2 g |
| Isobutyl methacrylate | 30.7 g |
| Oxidant solution: | |
| t-Butyl hydroperoxide, 70% | 0.0395 g |
| Deionized water | 3.7565 g |
| Reductant solution: | |
| Deionized water | 7.5 g |
| Sodium ascorbate | 0.0730 g |
| Iron (II) sulfate heptahydrate, 0.25% in deionized water | 0.60 g |

Polymerization Procedure

A 2 L, 4-neck round bottom flask is equipped with an overhead mechanical stirrer, a Y-tube equipped with a condenser and nitrogen purge line, a thermometer, and a stopper. To the flask were charged deionized water and surfactant. The pH was checked and found to be within the desired range of 4 to 5 so no pH adjustment was made. A sub-surface nitrogen purge was then initiated through the stopper. In a separate container, isobornyl methacrylate, styrene, and isobutyl methacrylate were combined. An oxidant solution was then prepared by dissolving 0.0395 g t-butyl hydroperoxide (70%) in 3.7565 g deionized water.

While maintaining nitrogen purge, the monomer mixture and the acetone co-solvent were slowly added the reaction vessel. During the addition, the agitation rate was gradually increased to 350 rpm. Several minutes after the monomer mixture and the acetone co-solvent additions were completed, the agitation rate was slowed to 225 rpm. Using a thermostatted water bath, the reaction temperature was brought to about 38° C.

When the reaction temperature was about 38° C., the oxidizer solution was added to the reaction mixture in a single shot. In a separate container, a reductant solution was prepared by dissolving 0.0730 g sodium ascorbate and 0.60 g of an 0.25 wt. % solution of iron (II) sulfate heptahydrate in deionized water in 7.5 g deionized water. About 5 minutes after the oxidant solution was added to the reaction mixture, the dark blue reductant solution was added via syringe to the reaction vessel in one shot while maintaining nitrogen purge. About 5 minutes after the addition of the reductant, the onset of an exotherm was noted. As the reaction progressed, a bluish tint was noted in the emulsion, and it became increasingly more translucent, and a slight increase in viscosity was noted. The bath temperature was maintained at about 40° C. by adding ice or cool water, as needed. The reaction temperature reached a maximum of about 41° C. before the exotherm began to subside after about 2 h. The reaction temperature was maintained thereafter at 38° C. using the water bath. After a total of 6 h reaction time, the reaction was cooled and poured through cheesecloth into a container. Coagulum (caught on cheesecloth) was noted and grit was measured.

The yield of polymer latex was 945 g. Solids (measured gravimetrically): 29.1%. Molecular weight by GPC (Method A): Mn=1,278,000; Mw=2,568,000; PDI=2.01.

Solid polymer was isolated by adding the undiluted emulsion polymer to a large excess of methanol. The resulting precipitate was collected by vacuum filtration and washed extensively with methanol.

Synthesis Examples S3-S18

Additional copolymers were prepared following the basic procedure used to prepare Synthesis Example 1. The compositions and properties of these polymers and those of Synthesis Examples S1 and S2 are summarized in the Table 1 below.

TABLE 1

Inventive copolymers.

| Example | P# | IBXMA | Styrene (Weight %) | IBMA | Tg (° C.) | Mw (kDa) | PDI |
|---|---|---|---|---|---|---|---|
| S1 |  | 55.6 | 34.1 | 10.3 |  | 351[a] | 3.71 |
| S2 |  | 55 | 35 | 10 | 124.7 | 2,568[a] | 2.01 |
| S3 |  | 25.0 | 0.0 | 75.0 | 92.4 | 4,200[d] | 1.31 |
| S4 |  | 50.0 | 0.0 | 50.0 | 117.8 | 4,950[c] | n.d. |
| S5 |  | 55.0 | 0.0 | 45.0 | 123.4 | 2,900[c] | n.d. |
| S6 | P42 | 80.0 | 0.0 | 20.0 | 162.6 | 2,801[b] | 2.12 |
| S7 |  | 45.0 | 15.0 | 40.0 | 112.8 | 4,300[d] | 1.34 |
| S8 |  | 45.0 | 25.0 | 30.0 | 113.4 | 3,600[d] | 1.29 |
| S9 | P64 | 50.0 | 25.0 | 25.0 | 110.0 | 2,964[b] | 2.35 |
| S10 | P44 | 51.5 | 31.5 | 17.0 | 122.5 | 3,053[b] | 2.14 |
| S11 | P62 | 55.0 | 35.0 | 10.0 | 128.3 | 3,217[b] 5,683[d] | 2.15[a] 1.28[c] |
| S12 | P65 | 55.0 | 35.0 | 10.0 | 120.6 | 3,220[b] | 2.49 |
| S13 |  | 58.8 | 33.1 | 8.1 | 131.3 | n.d. |  |
| S14 | P39 | 63.0 | 23.0 | 14.0 | 133.8 | 2,731[b] | 2.05 |
| S15 |  | 67.5 | 24.4 | 8.1 | 142.9. | 3,800[d] | 1.31 |
| S16 |  | 69.0 | 15.5 | 15.5 | 138.0 | 2,919[b] | 2.17 |
| S17 | P63 | 76.25 | 8.13 | 15.60 | 123.7 | 2,554[b] | 2.37 |
| S18 | P40 | 81.5 | 11.5 | 7.0 | 159.7 | 2,511[b] | 2.22 |

IBXMA = isobornyl methacrylate; IBMA = isobutyl methacrylate.
[a]Measured by Method A.
[b]Measured Method B.
[c]Measured by Method C.
[d]Measured by Method D
n.d. = not determined Comparative Example CE1

Polystyrene with a reported Mw of 280,000 was obtained from Sigma-Aldrich.

Comparative Example CE2

Poly(isobutyl methacrylate) with an inherent viscosity of 0.60 was obtained from Polysciences.

Comparative Example CE3 and Less Preferred Examples E4-E8

These copolymers were prepared following the procedure of Synthesis Example S2. The compositions and properties of these polymers and those of Comparative Examples 1 and 2 are summarized in the Table 2 below.

TABLE 2

Comparative and less preferred Examples.

| Example | P# | IBXMA | Styrene (Weight %) | IBMA | Tg (° C.) | Mw (kDa) | PDI |
|---|---|---|---|---|---|---|---|
| CE1 |  | 0.000 | 100.0 | 0.000 | 100* | 280 | n.d. |
| CE2 |  | 0.000 | 0.000 | 100.0 | 53* | n.d. |  |
| CE3 |  | 100.0 | 0.000 | 0.000 | 202.0 | 2,196[b] | 2.24 |
| E4 |  | 40.0 | 40.0 | 20.0 | 111.4 | 2,891[b] | 2.30 |
| E5 |  | 45.0 | 37.0 | 18.0 | 114.8 | 2,738[b] | 2.22 |
| E6 |  | 33.0 | 22.0 | 45.0 | 101.8 | n.d. |  |
| E7 |  | 25.0 | 10.0 | 65.0 | n.d. | n.d. |  |
| E8 |  | 15.0 | 0.0 | 85.0 | n.d. | n.d. |  |

IBXMA = isobornyl methacrylate; IBMA = isobutyl methacrylate.
[b]Measured by Method B.

Evaluation of Polymer Solubility in Diesel Fuel.
Solubility Index Method:

In a 20 mL vial with a cap, 0.2 g of polymer was added to 9.8 g B7 diesel fuel. The resulting mixture was loosely capped and stirred vigorously for 1 h at ambient room temperature (about 25° C.). The mixture was then heated to about 90° C. with stirring for 1 h. The resulting mixture or solution was allowed to cool to ambient room temperature and stand for 24 h. Polymer solubility was then determined by visual examination; polymers that showed any haze, turbidity or other signs of phase separation were judged to be insoluble. The mixture/solution was then placed in a refrigerator set at 8° C. for 24 h. Polymer solubility was then determined by visual examination; polymers that showed any haze, turbidity or other signs of phase separation were judged to be insoluble.

The B7 diesel fuel as used in these examples was based on a diesel base fuel having the characteristics given in Table 3 below.

TABLE 3

| Parameter | Method | Units |  |
|---|---|---|---|
| Cetane Number | DIN 51773 | — | 53.5 |
| Density @ 15° C. | DIN EN ISO 12185 | kg m−3 | 836.9 |
| Distillation | DIN EN ISO 3405 |  |  |
| IBP |  | ° C. | 179.2 |
| 5% v/v |  | ° C. | 203.2 |
| 10% v/v |  | ° C. | 214.4 |
| 20% v/v |  | ° C. | 232.0 |
| 30% v/v |  | ° C. | 247.1 |
| 40% v/v |  | ° C. | 261.9 |
| 50% v/v |  | ° C. | 276.2 |
| 60% v/v |  | ° C. | 290.3 |
| 70% v/v |  | ° C. | 305.0 |
| 80% v/v |  | ° C. | 319.7 |
| 90% v/v |  | ° C. | 335.9 |
| 95% v/v |  | ° C. | 349.1 |
| FBP |  | ° C. | 358.2 |
| Residue & loss |  | % vol | 1.9 |
| Flash Point | DIN EN ISO 2719 | ° C. | 69.0 |
| Viscosity @ 40° C. | DIN EN ISO 3104 | mm2 s−1 | 2.8687 |
| Sulphur - | DIN EN ISO 20884 | mg/kg | <10 |
| CFPP | DIN EN 116 | ° C. | −29 |
| Cloud point | DIN EN 23015 | ° C. | −8 |
| Fatty acid methyl ester | DIN EN 14078 | % vol | 6.4 |

Cloud Point Determination Method.

To a 4-neck 250 mL round bottom flask equipped with an overhead mechanical stirrer, thermometer, condenser and septum/stopper was charged 5.0 g of polymer to 50.0 g of B7 diesel fuel. The resulting mixture was heated to 70-80° C. with stirring until a homogeneous solution was obtained. In the case of comparative example CE1 [polystyrene], the polymer did not dissolve in B7 diesel fuel even after stirring at 140° C. for 3 h. A portion of the resulting solution was transferred to a 40 mL vial while warm. For polymers with a cloud point above about 25° C., the solution was allowed to cool to about 25° C. while it was manually stirred with a thermometer. The reported cloud point is the temperature at which the solution was visibly became turbid or cloudy. For polymers with a cloud point below about 25° C., the solution was cooled to a temperature below the point at which the solution became visibly turbid or cloudy using an ice/water bath or a dry ice/acetone bath. The resulting turbid/cloudy mixture was allowed to gradually warm up to 25° C., while it was manually stirred with a thermometer. The reported cloud point is the temperature at which the solution became clear. As a check, once the cloud point of a polymer was determined, clear solutions were gradually cooled (using cooling baths, if necessary) while stirring with a thermometer and the cloud point was confirmed. The results of the solubility evaluations of the Synthesis and Comparative Examples are summarized in Table 4.

TABLE 4

Polymer solubility evaluation results.

| Example | P# | IBXMA | Styrene (Weight %) | IBMA | Tg (° C.) | Cloud point @ 9.1% in B7 (° C.) |
|---|---|---|---|---|---|---|
| CE1 | | 0.000 | 100.0 | 0.000 | 100* | insoluble |
| CE2 | | 0.000 | 0.000 | 100.0 | 53* | 45 |
| CE3 | | 100.0 | 0.000 | 0.000 | 202.0 | −2 |
| E4 | | 40.0 | 40.0 | 20.0 | 111.4 | 37 |
| E5 | | 45.0 | 37.0 | 18.0 | 114.8 | 32 |
| E6 | | 33.0 | 22.0 | 45.0 | 101.8 | 32 |
| E7 | | 25.0 | 10.0 | 65.0 | | 33 |
| E8 | | 15.0 | 0.0 | 85.0 | | 34 |
| S1 | | 55.6 | 34.1 | 10.3 | | <25 |
| S2 | | 55 | 35 | 10 | 124.7 | 18 |
| S3 | | 25.0 | 0.0 | 75.0 | | 23 |
| S4 | | 50.0 | 0.0 | 50.0 | 117.8 | 6 |
| S5 | | 55.0 | 0.0 | 45.0 | 123.4 | −2 |
| S6 | P42 - 50 ppm | 80.0 | 0.0 | 20.0 | 162.6 | −1 |
| S7 | | 45.0 | 15.0 | 40.0 | 112.8 | 16 |
| S8 | | 45.0 | 25.0 | 30.0 | 113.4 | 22 |
| S9 | P64 - 50 ppm | 50.0 | 25.0 | 25.0 | 110.0 | 22 |
| S10 | P44 - 50 ppm | 51.5 | 31.5 | 17.0 | 122.5 | <25 |
| S11 | P62 - 25 ppm | 55.0 | 35.0 | 10.0 | 128.3 | <25 |
| S12 | P65 - 50 ppm | 55.0 | 35.0 | 10.0 | 120.6 | <25 |
| S13 | | 58.8 | 33.1 | 8.1 | n.d. | 17 |
| S14 | P39 - 50 ppm | 63.0 | 23.0 | 14.0 | 133.8 | <25 |
| S15 | | 67.5 | 24.4 | 8.1 | n.d. | 3 |
| S16 | | 69.0 | 15.5 | 15.5 | 138.0 | 0 |
| S17 | P63 - 80 ppm | 76.25 | 8.13 | 15.60 | 123.7 | <25 |
| S18 | P40 - 100 ppm | 81.5 | 11.5 | 7.0 | 159.7 | 0 |

The homopolymers of styrene and isobutyl methacrylate, CE1 and CE2, respectively, are not soluble in B7 diesel fuel, but surprisingly large amounts of these monomers can be copolymerized with isobornyl methacrylate to give highly soluble copolymers. For example, based on weight fraction of each comonomer in S16 one would expect the cloud point at 9.1 wt. % of this copolymer to be about 27° C. using a linear mixing model. Instead, it is 0° C., which is significantly and usefully different from the predicted value. Similarly, the predicted cloud point of S2, which contains over 40 wt. % of the insoluble comonomers styrene and isobutyl methacrylate is about 52° C., which is above the range of sufficient solubility, while the actual cloud point is 18° C., which is within the range of sufficient solubility.

For cost and performance reasons, the product of CE3 is not acceptable. For cost reasons, the product of example S6 is less preferred. The products of Examples E4-E8 are all less preferred because of the undesirable cloud point above 25° C.

Comparative Examples 4-7

Examples of the prior art were reworked. In CE4 the polymer of Example 1 step 1 in WO 2015/091513 was evaluated. In CE5 Example 12 of EP-A-0626442 was analysed. The resulting polymers had an Mw (using method D) of 79 and 95 kD, respectively. The molecular weight was too low to efficiently influence the rheology of a fluid in which it is dissolved.

In CE6 Example 7 of EP1260278 was reworked. However, no polymer resulted. In CE7 Embodiment 11 of CN103992428 was reworked. However, the resulting polymer could not be dissolved in B7 fuel at 85° C., indicating that the polymers have an undesired cloud point of >85° C.

Use Experiment.

The products of the invention with a P number as mentioned in table 3 were evaluated for their effect on diesel rheology and influence on ignition delay, burn period, and maximum pressure increase in a combustion research unit. First a concentrate was made in diesel containing at least 2.5 wt. % of the copolymer, which was subsequently diluted to a fuel with a concentration (in mg/kg) of the polymer as indicated behind the P number. The resulting data showed that a product in accordance with the invention, when used in a diesel fuel, improved the fuel efficiency of the direct injection diesel engine running on said fuel. While not wishing to be bound by this theory, it is believed that the improved efficiency is because the modified rheology due to the use of the polymer in the fuel, leads to an improved atomization of the fuel and a more complete combustion.

What is claimed is:

1. A solid copolymer formed from the following monomers:
   more than 20% and up to 81.5% by weight, based on the weight of all monomers, of at least one bicyclic (meth)acrylate ester,
   7% to 85% by weight of at least one C1-C7-alkyl (meth)acrylate based on the weight of all monomers,
   0% up to 40% by weight of at least one aromatic vinyl monomer based on the weight of all monomers, and
   optionally other ethylenically unsaturated monomers,
   wherein, if present, divinylbenzene is at an amount below 5% by weight, based on the weight of all monomers, and
   wherein the copolymer is soluble in B7 diesel fuel, has a weight averaged molecular weight from 2,000,000 to 10,000,000 Daltons, and has a glass transition temperature (Tg) of from 50 to 190° C.

2. The copolymer according to claim 1, wherein the bicyclic (meth)acrylate ester is of formula (I)

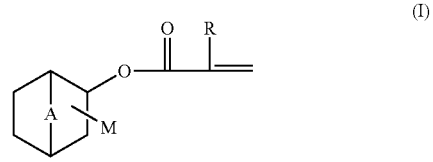

wherein R is H or —CH$_3$, A is CH$_2$—, —CH(CH$_3$)— or —C(CH$_3$)$_2$—, and M is covalently bonded to a carbon atom of the six-membered ring and is selected from the group consisting of hydrogen, a methyl group and combinations thereof.

3. The copolymer according to claim 1, wherein the copolymer is a random copolymer.

4. The copolymer according to claim 1 wherein the following monomers are reacted in amounts of:
- 40 to 81.5 wt % of the bicyclic (meth)acrylate ester,
- 10 to 60 wt % of the C1-C7-alkyl (meth)acrylate,
- 5 to 40 wt % of the aromatic vinyl monomer, and
- 0 to 40 wt % of other ethylenically unsaturated monomers,
- up to a total of 100 wt %, wherein the weight percentages of the monomer are based on the total weight of all the monomers,
- and wherein the glass transition temperature (Tg) is of from 101 to 163° C.

5. The copolymer according to claim 1, comprising at most 20 wt % of other ethylenically unsaturated monomers reacted to form the copolymer.

6. The copolymer according to claim 1, wherein the at least one bicyclic (meth)acrylate ester comprises, or is, isobornyl methacrylate.

7. The copolymer according to claim 1, wherein the at least one C1-C7-alkyl methacrylate comprises, or is, isobutyl (meth)acrylate.

8. The copolymer according to claim 1, comprising at least styrene, as an aromatic vinyl monomer.

9. The copolymer according to claim 8, wherein the weight percentage of bicylic (meth)acrylate ester is at least 15 weight percentage higher than the amount of aromatic vinyl monomer.

10. The copolymer according to claim 1, wherein the copolymer has a solubility of at least 2.0 weight percent in diesel B7 at 25° C.

11. The copolymer according to claim 1, wherein the copolymer has a cloud point of 25° C. or lower in diesel B7 fuel.

12. An additive package for fuels comprising the copolymer of claim 1.

13. A method for the preparation of the copolymer of claim 1 comprising the step of radically polymerizing the monomers.

14. A method for modifying the rheology of a fluid, the method comprising dissolving the copolymer of claim 1 into the fluid, wherein the fluid is not a fuel for combustion engines.

15. A solid copolymer that is formed from the free-radical polymerization of the following monomers:
- 15 to 82% by weight of isobornyl methacrylate based on the weight of all monomers;
- 7 to 85% by weight of isobutyl methacrylate based on the weight of all monomers;
- 0 up to 40% by weight of styrene based on the weight of all monomers;
- wherein, if present, divinylbenzene is at an amount below 5% by weight, based on the weight of all monomers, and
- wherein the copolymer is soluble in B7 diesel fuel as evidenced by a cloud point of from −2° C. to 37° C.,
- wherein the copolymer has a glass transition temperature (Tg) of from 101° C. to 163° C., and
- wherein the copolymer has a weight average molecular weight of from 2,500,000 to 5,700,000 Daltons.

16. The copolymer according to claim 15, wherein the weight percentage of the isobornyl methacrylate utilized is at least 15 weight percent higher than the amount of the isobutyl methacrylate utilized.

17. The copolymer according to claim 15 having a solubility of at least 2.0 weight percent in diesel B7 at 25° C. as determined as visually clear and free from haze and turbidity and also having a cloud point of from −2 to 25° C.

18. The copolymer according to claim 15 wherein the styrene is utilized in an amount of 8 to 35% by weight based on a total weight of all monomers.

19. The copolymer according to claim 15 having a polydispersity index of 1.28 to 2.49.

20. The copolymer according to claim 15 wherein:
- the isobornyl methacrylate is utilized in an amount of from 45 to 81.5% by weight based on the weight of all monomers;
- the isobutyl methacrylate is utilized in an amount of from 7 to 40% by weight based on the weight of all monomers; and
- the styrene is utilized in an amount of 8 to 35% by weight based on a total weight of all monomers.

* * * * *